United States Patent [19]

Kenney et al.

[11] Patent Number: 4,780,614
[45] Date of Patent: Oct. 25, 1988

[54] METHOD AND APPARATUS FOR REMOTE SENSING OF MECHANICAL FORCE

[75] Inventors: James F. Kenney, Kent; John E. Shrader, Mercer Island, both of Wash.

[73] Assignee: The Boeing Company, Seattle, Wash.

[21] Appl. No.: 726,710

[22] Filed: Apr. 24, 1985

[51] Int. Cl.⁴ .............................................. H05B 33/00
[52] U.S. Cl. .................... 250/484.1; 250/337
[58] Field of Search ............... 250/458.1, 459.1, 484.1, 250/337

[56] References Cited

U.S. PATENT DOCUMENTS

| 2,776,367 | 1/1957 | Lehovec . | |
|---|---|---|---|
| 2,798,959 | 7/1957 | Moncrieff-Yeates . | |
| 2,798,960 | 7/1957 | Moncrieff-Yeates . | |
| 2,894,145 | 7/1959 | Lehovec . | |
| 3,093,735 | 6/1963 | Blakewood et al. | 250/352 |
| 3,235,799 | 2/1966 | Hurvitz . | |
| 3,453,436 | 7/1969 | Nail . | |
| 3,470,490 | 9/1969 | Held et al. . | |
| 3,479,515 | 11/1969 | Snavely . | |
| 3,495,912 | 2/1970 | Hooper et al. . | |
| 3,556,663 | 1/1971 | Cary . | |
| 3,604,938 | 9/1971 | Kohachi et al. . | |
| 3,610,926 | 10/1971 | Kastner et al. | 250/484.1 |
| 3,625,589 | 12/1971 | Snitzer | 350/96 WG |
| 3,645,603 | 2/1972 | Smith . | |
| 3,659,136 | 4/1972 | Grodkiewicz et al. . | |
| 3,959,658 | 5/1976 | Ziemer et al. | 250/484.1 |
| 4,283,114 | 8/1981 | Wandrack | 350/96.20 |
| 4,355,910 | 10/1982 | Quick et al. . | |
| 4,492,121 | 1/1985 | Lehto | 250/368 |
| 4,598,202 | 7/1986 | Koechner | 250/369 |

FOREIGN PATENT DOCUMENTS 853611 10/1970 Canada .............................. 250/484.1

Primary Examiner—Janice A. Howell
Assistant Examiner—Richard Hanig
Attorney, Agent, or Firm—Foley & Lardner, Schwartz, Jeffery, Schwaab, Mack, Blumenthal & Evans

[57] ABSTRACT

A remote sensing device comprising light generating means positioned in the vicinity of an event being measured and means for conducting the generated light to a remote location. The light generating means advantageously comprises an optical emission mechanical transducer or bioluminescent device, or current generating means coupled with a light emitting diode, semiconductor laser or filament bulb. Also disclosed is a method according to the invention.

5 Claims, 1 Drawing Sheet

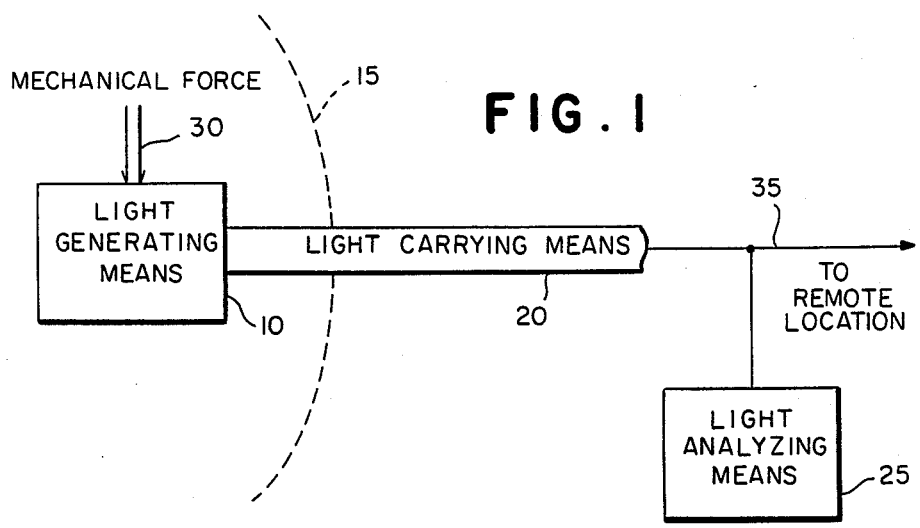
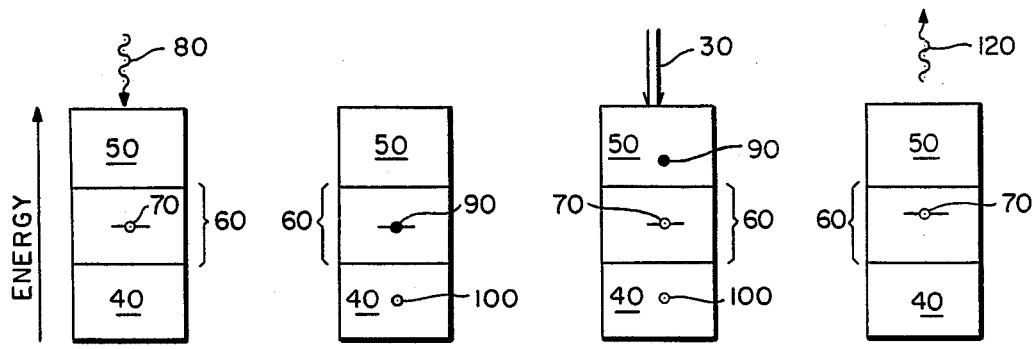
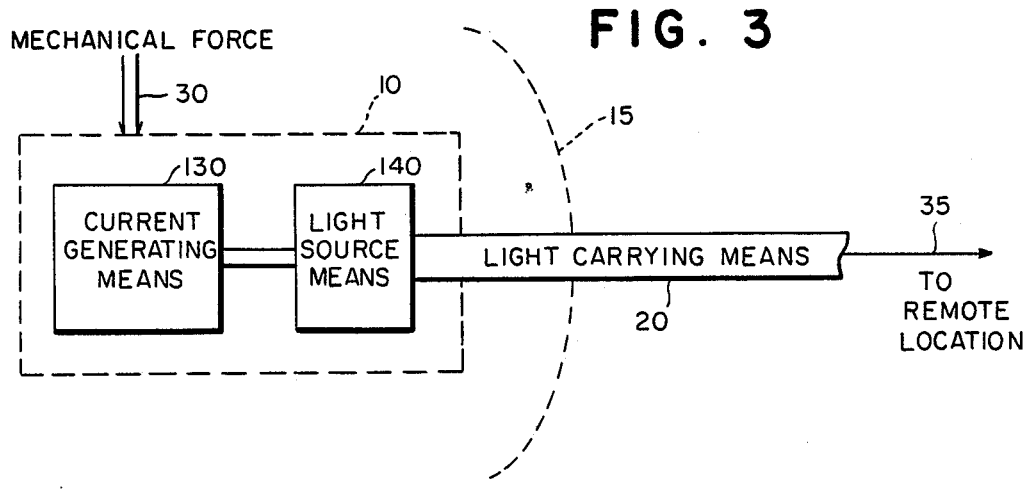

METHOD AND APPARATUS FOR REMOTE SENSING OF MECHANICAL FORCE

BACKGROUND OF THE INVENTION

The present invention relates to a method and apparatus for remote sensing of mechanical force caused by a given event by generating a light signal in the vicinity of the event and then transmitting the light signal to a remote location where it can be analyzed and stored as desired. The present invention has particular but not exclusive application to the remote sensing of mechanical forces such as those created by an explosion.

Measurement of mechanical force generated in the vicinity of hazardous conditions such as are produced in the testing of explosives can be difficult and expensive. The duration of such tests is typically very short, and they normally cannot be repeated. Nevertheless, it is often necessary to record large amounts of data generated by the explosion for later analysis. Furthermore, inasmuch as there is high probability that the remote sensing apparatus will be destroyed during the test, it is desirable that the equipment be inexpensive as well as reliable.

Conventional measurement of mechanical force generated in a hazardous test is typically accomplished by devices which transform mechanical force into an electrical signal. These include piezomagnetic devices, piezoelectric devices, strain gauges, and other varieties of pressure transducers. The electrical output of these devices typically must be amplified before it is transmitted to a remote data recorder. When it is necessary to make measurements in a very hostile environment the electrical devices, cabling, and other instrumentation are frequently destroyed. These devices also have the disadvantage that reliable operation of electrical circuits and transmission of the electric signals are frequently disrupted by the very event they are intended to measure, so that the readings obtained are distorted part usefulness. For example, a phenomenon known as the "cable-squeeze" phenomenon causes the generation of spurious electrical impulses when a cable is deformed. It is difficult thereafter to discriminate between these spurious impulses and the data signals generated by the transducer.

In summary, prior art methods and apparatus which rely upon proximate generation and subsequent transmission of an electrical signal to a remote location to measure mechanical forces have not proved to be satisfactory due to unreliability, expense, and the difficulty in interpreting data acquired thereby.

SUMMARY OF THE INVENTION

The present invention comprises means for generating light in response to mechanical force, the light generating means being positioned in the vicinity of the event generating the mechanical forces to be measured. Optically connected to the light generating means are means for conducting the generated light to a remote location. In this context, an "event" is any occurrence which is capable of producing mechanical force, most notably, an explosion. "Vicinity" means a region within or adjacent the event which is subjected to the mechanical force being measured. A "remote location" will be a region sufficiently removed from the event that there is no substantial likelihood that instrumentation and the like positioned at the remote location will be damaged by the event. "Remote sensing" is analysis and/or recordation of signals at the remote location.

A method and apparatus according to the present invention eliminates the need to send electrical signals through cables over long distances in which the cable may be subjected to mechanical forces leading to spurious signals. Also eliminated is the need to amplify the signal in most instances. The light generating means may be any means for producing light in response to a mechanical signal either directly, as with an optical emission mechanical transducer, or indirectly, by generating an electrical current and then immediately converting that electrical current into light. The means for carrying light is preferably an optical fiber. The light generating means and the light carrying means are optically connected or coupled in a fashion which will be apparent to one of ordinary skill in the art.

BRIEF DESCRIPTION OF THE DRAWINGS

These and other advantages and features of the present invention will be more clearly understood from the following written description read in conjunction with the drawings, in which:

FIG. 1 is a schematic diagram of an apparatus for remote sensing of mechanical force according to the present invention;

FIGS. 2A-2D show schematic diagrams of energy bands in an optical emission mechanical transducer used in conjunction with an embodiment of the invention as represented in FIG. 1; and FIG. 3 is a schematic diagram of another embodiment of an apparatus for remote sensing of mechanical force according to the present invention.

DETAILED DESCRIPTION OF THE PREFERRED EMBODIMENTS

FIG. 1 is a schematic diagram of one embodiment of the present invention. Light generating means 10 is optically coupled to light carrying means 20. Light generating means 10 is located in the vicinity of, for example, an explosion, so that it is subjected to mechanical force represented by arrow 30. The perimeter of the vicinity of the explosion is delineated by broken line 15, the region to the left of this line being the vicinity of the explosion. Objects in this region will be subjected to a maximal intensity of mechanical force so that there is a substantial likelihood objects in this region will be destroyed. The mechanical force causes light generating means 10 to generate light which is propagated through light carrying means 20 in the direction of arrow 35 to a remote location where it can be sampled, stored, and analyzed as desired by, for example, light analyzing means 25. As mentioned above, "remote location" here means a location sufficiently spatially displaced from the event that there is no substantial likelihood that objects at the remote location will be destroyed thereby. It will be appreciated by one of ordinary skill in the art that specific distances for regions in the "vicinity" of or "remote" from the event being studied vary greatly depending on the magnitude and nature of the event.

The preferred device to use as light generating means 10 is an optical emission mechanical transducer. The quantum mechanical energy levels for a solid state phosphor which can serve as such a transducer are diagrammed in FIGS. 2A-2D. In FIG. 2A the phosphor is shown in its unexcited state with a first filled energy band 40 separated from a second energy band 50

(conduction band) by a classically forbidden band 60. Band 60 has an impurity acceptor or dislocation level, hereinafter referred to as trap level 70, which is vacant. Trap level 70 is a metastable state which an electron may occupy for an extended period of time unless an excitation of sufficient energy occurs to move the electron from trap level 70 into second energy band 50. The incoming wavy line represents a photon 80 having sufficient energy to excite an electron in first energy band 40 into second energy band 50, from which it can make a subsequent transition to trap level 70 as depicted in FIG. 2B. Electron 90 has left first energy band 40 and now occupies trap level 70. The electron hole is depicted at 100. The photon 80 may represent, for example, an incident X ray, gamma ray or the like. It is important to keep in mind that in order to move from first energy band 40 to trap level 70, the electron must first be excited to second energy band 50 for subsequent transition to trap level 70 because direct transition between trap level 70 and first energy band 40 are forbidden, i.e., highly improbable. The electron stays a metastable state in trap level 70 for an extended period of time.

The foregoing description is of well-known phosphor physics. A phosphor such as that described is commonly used, for example, as a radiation detector or dosimeter. When used as such, an unexcited phosphor (metastable levels unpopulated) is exposed to radiation, the amount of which it is desired to measure. The energy of the radiation is then stored in the crystal lattice as electrons inserted into the metastable state. The phosphor is then lateral thermally excited to approximately 200–300 degrees Centigrade to induce de-excitation. The phosphor will typically start to surrender its stored energy as a light signal at around 200 degrees Centigrade, the light signal typically peaking at around 260 degrees Centigrade and falling off thereafter. The intensity of light plotted as a function of the temperature of the phosphor produces what is called a glow curve. The total amount of light emitted is proportional to the area under the curve and to the total amount of radiation energy absorbed.

In an application typical of the present invention, on the other hand, a deliberately excited phosphor having a sufficient population of occupied trap levels is placed where it will be subjected to the mechanical force being studied. This force is represented as before with an arrow 30 in FIG. 1. This force supplies sufficient energy to knock some of the electrons up out of trap level 70 into second energy band 50 as depicted in FIG. 2C. From second energy band 50 the electron can then make the transition back down to first energy band 40, emitting a photon 120 in the process as shown in FIG. 2D.

Thus, the phosphor is used in the present invention quite differently from how it would be used in the prior art. In the prior art, the phosphor is *excited* in an uncontrolled manner by the phenomenon desired to be measured, and then de-excited in a controlled manner to study the phenomenon which originally excited the phosphor. In the present invention, on the other hand, the phosphor is excited in a controlled fashion, then *de-excited* in an uncontrolled manner to study the phenomenon to be measured. As is readily apparent, the present invention represents a radical departure from the manner in which phosphors have been used in the past.

Optimal performance of the transducer just described depends primarily on judicious choices of the width of band 60, and the locations of the trap levels 70. Band 60 must be sufficiently wide to prevent an electron from making the transition from the first energy level 40 to the second energy band 50 by normally available energy. For example, for transducer operation at room temperature, the width of band 60 must at least exceed the amount of thermal energy available to excite the electrons. Inasmuch as the physics of these phosphors is well understood from other applications, however, tailoring a specific phosphor for this application by suitable selection of the composition of the host lattice as well as composition and concentration of impurities will be apparent to one of ordinary skill in the art. As a specific example, the host lattice component may be zinc silicate or zinc sulphate, appropriately doped with arsenic or beryllium. Reference may also be made to the standard references of Peter Pringsheim *Fluorescence and Phosphorescence* and Jacques I. Pankove, *Optical Processes in Semiconductors* incorporated herein by reference.

The energy difference between second energy band 50 and trap level 70 must also be great enough to prevent accidental excitation of electrons by normally-available amounts of energy. It will be apparent that satisfying this requirement automatically satisfies the previously stated requirement on the difference in energy levels between first energy band 40 and second energy band 50 because trap level 70 is between the two. Thus, the energy difference between trap level 70 and second energy band 50 must be large compared to the thermal energy available at the ambient temperature of operation. A similar requirement applies to the energy difference between the first energy band 40 and the trap level 70 to prevent populating trap level 70 spontaneously from first energy band 40.

As mentioned, a transducer such as that just described is deliberately pre-excited and then placed in a position where it will be spontaneously de-excited by the mechanical forces to be measured. For example, if band 60 is several electron volts wide, ultraviolet, X ray, or gamma-ray radiation will suffice to populate trap level 70. If the energy level of trap level 70 is well-chosen, i.e., sufficiently less than the energy of second energy band 50, this inverted electron population can exist in trap levels 70 for protracted periods of time. The mechanical forces the transducer experiences during a test raise the electrons populating trap levels 70 to second energy band 50 from which they spontaneously decay. All that remains to be done at that point is to suitably gather the light and couple it into light carrying means 20 to be carried to the remote location.

It is also possible to use a suitable bioluminescent device as light generating means 10.

The force measured in accordance with the principles of the invention as described above need not be limited to mechanical stress or shock forces. Thermal energies may also be measured wherein the phenomenon produces thermal energies above the ambient thermal energies for the specific phosphor employed.

An alternative embodiment of the present invention is illustrated schematically in FIG. 3. Therein, light generating means 10 is depicted as a box in phantom to show that it comprises current generating means 130 electrically connected to light source means 140. The operation of this embodiment is substantially the same as that already described, except that the mechanical force represented by arrow 30 stimulates current generating means 130, which produces an electrical current instead of light. Current generating means 130 may be any conventional, suitable device which produces an electrical current in response to a mechanical force, such as a piezoelectric crystal. The current generated by current generating means 130 causes light source means 140 to generate light. It is this light which is carried by light carrying means 20. Light source means 140 is any conventional, suitable device for turning an electrical current into light, such as a semiconductor laser, a light emitting diode, or even a filament bulb. As will be understood by one of ordinary skill in the art, whereas the embodiment previously described entailed the direct generation of light from a mechanical force, this embodiment entails generating an electric current in response to a mechanical force, and then transforming that current into a light signal. This embodiment nevertheless retains the advantages of that previously described in that the signal ultimately transmitted to the remote location is a light signal which is less vulnerable to distortion and interference by spurious signals than an electrical signal propagating within a conductor.

It should be noted that an amplifier has not been mentioned as a part of the preferred embodiment. The lack of need for an amplifier represents a distinction and advantage of the present invention over prior art remote sensing devices.

Although the present invention has been described by reference to several preferred embodiments, it will be understood by one of ordinary skill in the art that the teachings of the invention may be practiced without employing the specific embodiments described herein. Therefore, the present invention is not to be regarded as limited to the specific embodiments described, herein, but instead is limited only according to the following claims.

What is claimed is:

1. In a method of measuring mechanical or thermal energy resulting from an event, comprising the steps of:
   (a) prior to the occurrence of said event, pre-exciting a phosphor to a metastable state wherein electrons of said phosphor occupy energy levels between a first band, corresponding to an unexcited state of the phosphor and a second band, corresponding to a conduction band;
   (b) prior to the occurrence of said event, positioning said pre-excited phosphor in the vicinity of the event;
   (c) only as a direct result of mechanical or thermal energy of said event and simultaneous with said event, further exciting said phosphor from said metastable state such that electrons of said metastable state transition to said second band and subsequently to said first band, emitting radiation in the process;
   (d) collecting at least a portion of the radiation emitted as a result of a transition of the electrons from said second band to said first band;
   (e) transmitting the collected radiation to a location remote from said event; and
   (f) measuring said transmitted radiation.

2. A method as recited in claim 1, wherein said event comprises an explosion and step (b) includes placing the pre-excited phosphor in the vicinity of the explosion prior to the explosion.

3. Apparatus for remote sensing of a mechanical force or thermal energy generated by an event, comprising:
   (a) means, disposed in the vicinity of said event, for generating radiation simultaneously with the occurrence of event and in an amount directly corresponding to the magnitude of said force or energy, said generating means including a phosphor having populated metastable energy levels which transition only in response to said mechanical force or thermal energy of said event to an energy level higher than said metastable level and which subsequently emit radiation in transitioning to an energy level lower than said metastable energy level; and
   (b) means for collecting and transmitting said radiation to a remote location, said collecting and transmitting means including an optical fiber.

4. Apparatus as recited in claim 3 further comprising means optically connected to said optical fiber and positioned at said remote location for analyzing said radiation and producing data corresponding to the event.

5. Apparatus for remote sensing of a mechanical force or thermal energy generated by an explosion, comprising:
   (a) means, disposed in the vicinity of said explosion for generating radiation simultaneously with the occurrence of said explosion and in an amount directly corresponding to the magnitude of said force or energy, said generating means including a phosphor having populated metastable energy levels which transition only in response to said mechanical force or thermal energy of said explosion to an energy level higher than said metastable level and which subsequently emit said radiation in transitioning to an energy level lower than said metastable energy level; and
   (b) means for collecting and transmitting said radiation to a remote location, said collecting and transmitting means including an optical fiber.

* * * * *